(12) United States Patent
Kuze

(10) Patent No.: US 9,765,714 B2
(45) Date of Patent: Sep. 19, 2017

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Yasuhiro Kuze, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 165 days.

(21) Appl. No.: 14/780,057

(22) PCT Filed: Jan. 8, 2014

(86) PCT No.: PCT/JP2014/050142
§ 371 (c)(1),
(2) Date: Sep. 25, 2015

(87) PCT Pub. No.: WO2014/156211
PCT Pub. Date: Oct. 2, 2014

(65) Prior Publication Data
US 2016/0053695 A1    Feb. 25, 2016

(30) Foreign Application Priority Data

Mar. 27, 2013  (JP) ................................ 2013-066968

(51) Int. Cl.
*F02B 33/00*   (2006.01)
*F02D 41/00*   (2006.01)
(Continued)

(52) U.S. Cl.
CPC ........... *F02D 41/0077* (2013.01); *F02D 9/08* (2013.01); *F02D 31/005* (2013.01);
(Continued)

(58) Field of Classification Search
CPC ............. F02D 41/0077; F02D 41/0007; F02D 41/005; F02D 41/08; F02D 41/3076;
(Continued)

(56) References Cited

U.S. PATENT DOCUMENTS 4,282,713 A * 8/1981 Antoku ................... F02B 37/16
                                                     60/600
4,551,977 A * 11/1985 Matsumura ........... F02B 33/446
                                                     60/611
(Continued)

FOREIGN PATENT DOCUMENTS

EP    0881375 A2   12/1998
EP    0889216 A2    1/1999
(Continued)

OTHER PUBLICATIONS

Office Action dated Jan. 11, 2017 in U.S. Appl. No. 14/780,168.
(Continued)

*Primary Examiner* — Hai Huynh
*Assistant Examiner* — Gonzalo Laguarda
(74) *Attorney, Agent, or Firm* — Andrews Kurth Kenyon LLP

(57) ABSTRACT

An internal combustion engine of the present invention is an internal combustion engine equipped with port injectors. Further, the internal combustion engine has an ISC passage that connects an upstream side and a downstream side of a throttle valve in an intake passage, and an ISC valve that regulates an amount of air flowing in the ISC passage. A control device of the present invention performs valve opening control that makes an opening degree of the ISC valve an opening degree larger than a reference opening degree when request torque required by the internal combustion engine is smaller than estimated torque that can be generated in the internal combustion engine, and sets a (Continued)

timing for fuel injection from the port injector at an opening timing of an intake valve of a cylinder in which the port injector is installed during the valve opening control.

4 Claims, 5 Drawing Sheets

(51) Int. Cl.
| | |
|---|---|
| *F02D 41/30* | (2006.01) |
| *F02D 31/00* | (2006.01) |
| *F02M 25/07* | (2006.01) |
| *F02D 9/08* | (2006.01) |
| *F02P 5/05* | (2006.01) |
| *F02D 41/40* | (2006.01) |
| *F02D 41/08* | (2006.01) |
| *F02M 26/05* | (2016.01) |

(52) U.S. Cl.
CPC ....... *F02D 41/005* (2013.01); *F02D 41/0007* (2013.01); *F02D 41/08* (2013.01); *F02D 41/3076* (2013.01); *F02D 41/401* (2013.01); *F02M 25/0706* (2013.01); *F02M 25/0707* (2013.01); *F02M 25/0709* (2013.01); *F02M 25/0771* (2013.01); *F02P 5/05* (2013.01); *F02M 26/05* (2016.02); *Y02T 10/144* (2013.01); *Y02T 10/44* (2013.01); *Y02T 10/47* (2013.01)

(58) Field of Classification Search
CPC ........ F02D 41/401; F02D 9/08; F02D 9/1055; F02D 31/005; F02D 31/007; F02D 31/008; F02M 25/0706; F02M 25/0707; F02M 25/0709; F02M 25/0771; F02M 26/05; F02P 5/05
USPC ..... 123/339.12, 399, 345–348, 339.1, 90.11, 123/90.15, 436, 559.1; 701/103–105; 60/605.1, 598
See application file for complete search history.

(56) References Cited

U.S. PATENT DOCUMENTS

| | | | | |
|---|---|---|---|---|
| 4,836,164 | A * | 6/1989 | Morozumi | F02D 31/005 123/339.17 |
| 6,006,723 | A * | 12/1999 | Akabori | F02D 41/083 123/339.17 |
| 6,052,995 | A * | 4/2000 | Krimmer | F02B 37/16 123/564 |
| 6,279,551 | B1 | 8/2001 | Iwano et al. | |
| 8,161,743 | B2 * | 4/2012 | Okamura | F02B 37/16 123/561 |
| 8,371,276 | B2 | 2/2013 | Pursifull et al. | |
| 8,596,065 | B2 | 12/2013 | Okada | |
| 9,115,657 | B2 | 8/2015 | Yoshioka et al. | |
| 9,359,940 | B2 | 6/2016 | Ahrns | |
| 2009/0301447 | A1 | 12/2009 | Gates et al. | |
| 2012/0023937 | A1 | 2/2012 | Styles et al. | |
| 2012/0247438 | A1 * | 10/2012 | Konohara | F01M 13/022 123/559.1 |
| 2014/0130493 | A1 | 5/2014 | Spix et al. | |
| 2015/0082790 | A1 | 3/2015 | Yoshioka et al. | |
| 2016/0047339 | A1 | 2/2016 | Kuze | |
| 2016/0047350 | A1 | 2/2016 | Kuze | |
| 2016/0061126 | A1 | 3/2016 | Kuze | |

FOREIGN PATENT DOCUMENTS

| | | |
|---|---|---|
| JP | S59-115444 A | 7/1984 |
| JP | S59-115445 A | 7/1984 |
| JP | S59-224440 A | 12/1984 |
| JP | 60-017234 A | 1/1985 |
| JP | 61-025934 A | 2/1986 |
| JP | 2000-154751 A | 6/2000 |
| JP | 2000-297663 A | 10/2000 |
| JP | 2001-090543 A | 4/2001 |
| JP | 2002-030974 A | 1/2002 |
| JP | 2003-27921 A | 1/2003 |
| JP | 2004-346917 A | 12/2004 |
| JP | 2005-90273 A | 4/2005 |
| JP | 2007-177794 A | 7/2007 |
| JP | 2008-038662 A | 2/2008 |
| JP | 2012-007547 A | 1/2012 |
| JP | 2012-017708 A | 1/2012 |
| JP | 2012-102617 A | 5/2012 |
| JP | 2012-158997 A | 8/2012 |
| JP | 2013-136987 A | 7/2013 |
| JP | 2013-174219 A | 9/2013 |
| JP | 2014-190264 A | 10/2014 |
| JP | 2014-190340 A | 10/2014 |
| WO | 2008/142549 A1 | 11/2008 |

OTHER PUBLICATIONS

Japanese Office Action dated Sep. 1, 2015, in Japanese Patent Application No. 2013-262565; with partial English translation.
U.S. Patent and Trademark Office, Final Office Action in U.S. Appl. No. 14/780,168 dated Jul. 13, 2017, 9 pages.

* cited by examiner

START
S10: ISC VALVE FULL OPENING PROHIBITION FLAG = CLEARED
S12: ACQUIRE REQUEST TORQUE
S14: ACQUIRE ENGINE CONTROL TARGET VALUE
S16: CALCULATE PREDICTED GENERATION TORQUE
S18: PREDICTED GENERATION TORQUE > REQUEST TORQUE
S20: P2 > P1
S22: ISC VALVE → FULLY OPEN
RETURN

START
S102: IS ISC VALVE FULL OPENING CONTROL UNDER EXECUTION
S104: TARGET AIR-FUEL RATIO → STOICHIOMETRIC
S106: IS LEAN COMBUSTION OPERATION CONDITION ESTABLISHED
S108: TARGET AIR-FUEL RATIO → LEAN
RETURN

START
S112: UNDER LEAN COMBUSTION OPERATION
S114: ISC VALVE FULL OPENING PROHIBITION FLAG → SET
S116: ISC VALVE FULL OPENING PROHIBITION FLAG → CLEAR
RETURN

START
S502: ISC VALVE FULL OPENING CONTROL UNDER EXECUTION
S504: PORT INJECTION TIMING → INTAKE VALVE OPENING TIME
S506: PORT INJECTION TIMING → NORMAL CONTROL
RETURN

START
S502: ISC VALVE FULL OPENING CONTROL UNDER EXECUTION
S510: PROHIBIT PORT INJECTION
S512: FUEL INJECTION SHARING RATIO → NORMAL CONTROL
RETURN

CONTROL DEVICE FOR INTERNAL COMBUSTION ENGINE

CROSS-REFERENCE TO RELATED APPLICATIONS

This is a national phase application based on the PCT International Patent Application No. PCT/JP2014/050142 filed Jan. 8, 2014, claiming priority to Japanese Patent Application No. 2013-066968 filed Mar. 27, 2013, the entire contents of both of which are incorporated herein by reference.

TECHNICAL FIELD

The invention relates to a control device for an internal combustion engine, and more particularly relates to a control device for an internal combustion engine including a bypass passage that connects an upstream side and a downstream side of a throttle valve, in an intake passage of the internal combustion engine.

BACKGROUND ART

Conventionally, there has been disclosed a control device for an internal combustion engine equipped with a supercharger, for example, in Patent Literature 1. Further, Patent Literature 1 proposes control of ignition timing for restraining an output variation that occurs when a target intake air that is set in response to request torque and an actual intake air amount differs. Specifically, the control device in Patent Literature 1 performs control of delaying ignition timing at a time of overshoot when an actual intake air amount is larger than a target intake air amount, and advancing the ignition timing at a time of undershoot when the actual intake amount is smaller than the target intake air amount.

CITATION LIST

Patent Literatures

Patent Literature 1: Japanese Patent Laid-Open No. 2004-346917
Patent Literature 2: Japanese Patent Laid-Open No. 2012-102617

SUMMARY OF INVENTION

Technical Problem

In the control of Patent Literature 1 described above, the output variation which occurs when the target intake air amount differs from the actual intake air amount is restrained by advancing or delaying the ignition timing. However, in the case of an internal combustion engine having a supercharger, the ignition timing is sometimes set at a delay side from MBT in a turbocharging region, in order to restrain knocking. In such a case, a margin up to a delay limit of the ignition timing is small. In such a case, it is conceivable that even if the actual intake air amount is larger than the target intake air amount, and reduction of the output torque is required, torque cannot be sufficiently reduced by only delay control of the ignition timing.

Here, in the case of an internal combustion engine having an ISC passage that connects an upstream side and a downstream side of the throttle valve, and having an ISC valve in the ISC passage, it is conceivable to open the ISC valve and cause the intake air to flow back to the upstream side from the ISC passage. Thereby, the amount of intake air that flows into the cylinder can be reduced, and the torque can be reduced.

However, with the control of opening the ISC valve like this, the intake air flows back in the ISC passage. Therefore, it is conceivable that depending on the operation state, the fuel which is injected to the intake port flows back to the upstream side, and makes combustion unstable and causes worsening of emissions and the like.

The invention has an object to solve the above described problem, and provides a control device for an internal combustion engine that is improved to restrain combustion from becoming instable by realization of request torque by control of an ISC valve when there is a request to reduce output torque.

Means for Solving the Problems

In order to attain the above described object, a first invention is a control device for an internal combustion engine, comprising:

a throttle valve that is installed in an intake passage of the internal combustion engine including a supercharger;

an ISC passage that connects an upstream side and a downstream side of the throttle valve, in the intake passage;

an ISC valve that regulates an amount of air that flows in the ISC passage by being controlled to a predetermined opening degree;

a port injector that is installed to inject fuel to an intake port of each of cylinders of the internal combustion engine;

control means for executing valve opening control that makes an opening degree of the ISC valve an opening degree larger than a reference opening degree, when request torque required by the internal combustion engine is smaller than estimated torque that can be generated in the internal combustion engine; and restriction means for restricting a timing for fuel injection from the port injector, during execution of the valve opening control.

A second invention is such that, in the first invention,
the restriction means includes means for setting a timing for fuel injection from the port injector at an opening timing of an intake valve of the cylinder in which the port injector is installed, during execution of the valve opening control.

A third invention is such that, in the first invention,
the restriction means includes means for prohibiting fuel injection from the port injector during the valve opening control.

Here, "a reference opening degree" is desirably set at an maximum opening degree at which the ISC valve is fully opened, or a large opening degree close to the maximum opening degree.

Advantageous Effect of Invention

According to the present invention, backflow of the fuel in the valve opening control of the ISC valve can be restrained.

MODE FOR CARRYING OUT THE INVENTION

Hereinafter, an embodiment of the present invention will be described with reference to the drawings. Note that in the respective drawings, the same or corresponding parts will be assigned with the same reference signs and explanation thereof will be simplified or omitted.

Embodiment 1

[Configuration of Embodiment 1]

Figure 1:
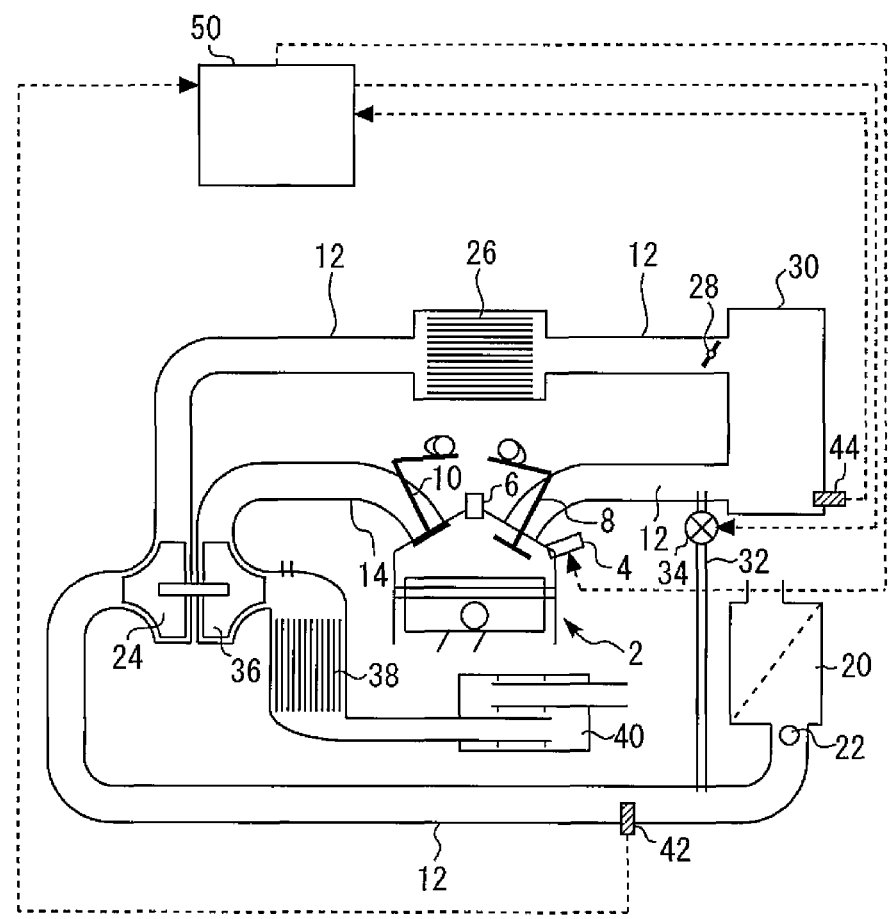
FIG. 1 is a schematic diagram for explaining an entire configuration of a system of embodiment 1 of the present invention.

FIG. 1 is a schematic diagram for explaining a system configuration of embodiment 1 of the present invention. A system of the present embodiment includes a spark-ignition type internal combustion engine 2 to be a target of application of a control device. The internal combustion engine 2 uses gasoline as fuel, and can be preferably used as a power plant of a vehicle, for example. The internal combustion engine 2 can perform a stoichiometric combustion operation that combusts a mixture gas with an air-fuel ratio close to a theoretical air-fuel ratio (hereinafter, "stoichiometry"), and a lean combustion operation that combusts a mixture gas with an air-fuel ratio much leaner than the theoretical air-fuel ratio in a predetermined lean combustion operation region by switching between the stoichiometric combustion operation and the lean combustion operation. Further, FIG. 1 illustrates only one cylinder of the internal combustion engine 2, but the internal combustion engine 2 includes a plurality of cylinders. The number of cylinders and disposition of the cylinders of the internal combustion engine 2 are not specially limited.

Each of the cylinders of the internal combustion engine 2 is provided with a cylinder injector 4 and an ignition plug 6. The cylinder injectors 4 are installed to inject fuel into the respective cylinders of the internal combustion engine 2. In the configuration in FIG. 1, the cylinder injectors 4 are provided, but port injectors that inject fuel into intake ports may be used. Each of the cylinders of the internal combustion engine 2 is provided with an intake valve 8 and an exhaust valve 10. In the system, a variable valve mechanism (not illustrated) that controls opening and closing of the respective intake valves 8 and exhaust valves 10 is installed.

A downstream side end portion of an intake passage 12, and an upstream side end portion of an exhaust passage 14 respectively communicate with the respective cylinders. An air cleaner 20 is mounted in a vicinity of an inlet of the intake passage 12. An air flow meter 22 that outputs a signal corresponding to a flow rate of air that is taken into the intake passage 12 is provided in a vicinity of a downstream side of the air cleaner 20. A compressor 24 for turbocharger is installed downstream of the air flow meter 22.

An intercooler 26 that cools compressed air is provided downstream of the compressor 24 in the intake passage 12. An electronically controlled type throttle valve 28 is provided downstream of the intercooler 26. A surge tank 30 is provided downstream of the throttle valve 28.

The system in FIG. 1 has an ISC (Idle Speed Control) passage 32 that connects an upstream side of the throttle valve 28 and a downstream side of the throttle valve 28 in the intake passage 12. Specifically, one end of the ISC passage 32 is connected to a downstream side of the air cleaner 20 in the intake passage 12 and an upstream side of the compressor 24. The other end of the ISC passage 32 is connected to a downstream side of the surge tank 30, in the intake passage 12. In the ISC passage 32, an ISC valve 34 that opens and closes the ISC passage 32 is installed. The ISC valve 34 is a valve for changing a channel sectional area of the ISC passage 32 by an opening degree thereof being controlled to a predetermined opening degree, and regulating a flow rate of a gas flowing in the ISC passage 32.

In the exhaust passage 14, an exhaust turbine 36 of the turbocharger is installed. A catalyst 38 for purifying an exhaust gas is installed downstream of the exhaust turbine 36, and a muffler 40 is further installed downstream of the catalyst 38.

The system in FIG. 1 has a first pressure sensor 42 and a second pressure sensor 44. The first pressure sensor 42 is installed in a vicinity of a connection portion with the ISC passage 32, between the air cleaner 20 and the compressor 24 in the intake passage 12. By the first pressure sensor 42, a first pressure P1 that is an intake pressure in a vicinity of a connection portion of the ISC passage 32 and the intake passage 12 is acquired. The second pressure sensor 44 is installed in the surge tank 30. A second pressure P2 that is an intake pressure in the surge tank 30 is acquired based on an output of the second pressure sensor 44.

The system in FIG. 1 includes an ECU (Electronic Control Unit) 50. The control device of the present invention is realized as one function of the ECU 50. Various sensors for sensing an operation state of the internal combustion engine 2, such as the air flow meter 22 and the first and the second pressure sensors 42 and 44 described above are connected to the ECU 50. Further, various actuators that control the operation state of the internal combustion engine 2 such as the throttle valve 28, the cylinder injector 4 and the ignition plug 6 described above are connected to the ECU 50. The ECU 50 controls the operation state of the internal combustion engine 2 by executing a control program which is stored in a memory in advance, in accordance with parameters relating to the operation state of the internal combustion engine which are the result of acquiring the outputs of the respective sensors.

[Outline of ISC Valve Full Opening Control of Present Embodiment]

Control that is executed by the control device in the present embodiment includes control relating to an opening and a closing states of the ISC valve 34. In the control, the control device acquires request torque, and predicted generation torque (also called estimated torque) that is torque which can be generated in the internal combustion engine. The request torque and the predicted generation torque are calculated by a known method, and here, the calculation method is not limited. Further, the request torque and the predicted generation torque are not limited to the torque that is directly calculated by the control device in the present embodiment, but may be inputted by a system which is disposed at a higher rank than the control device.

The control device performs control of fully opening the ISC valve 34 under conditions that the predicted generation torque which is acquired is larger than the request torque, and that the second pressure P2 is larger than the first pressure P1. By fully opening the ISC valve 34 in the state in which the second pressure P2 at the downstream side of the intake passage 12 is larger than the first pressure P1 at the upstream side, the intake air is caused to flow back to the upstream side, and an internal pressure of the surge tank 30 can be reduced. Thereby, a torque variation in the case of the predicted generation torque is larger than the request torque is restrained. In the following embodiment, the valve opening control that fully opens the ISC valve 34 when the above described conditions (namely, the predicted generation torque is larger than the request torque, and the second pressure P2 is larger than the first pressure P1) are satisfied is also called "ISC valve full opening control". Further, the conditions are also called "ISC valve fully opening conditions".

Figure 2:
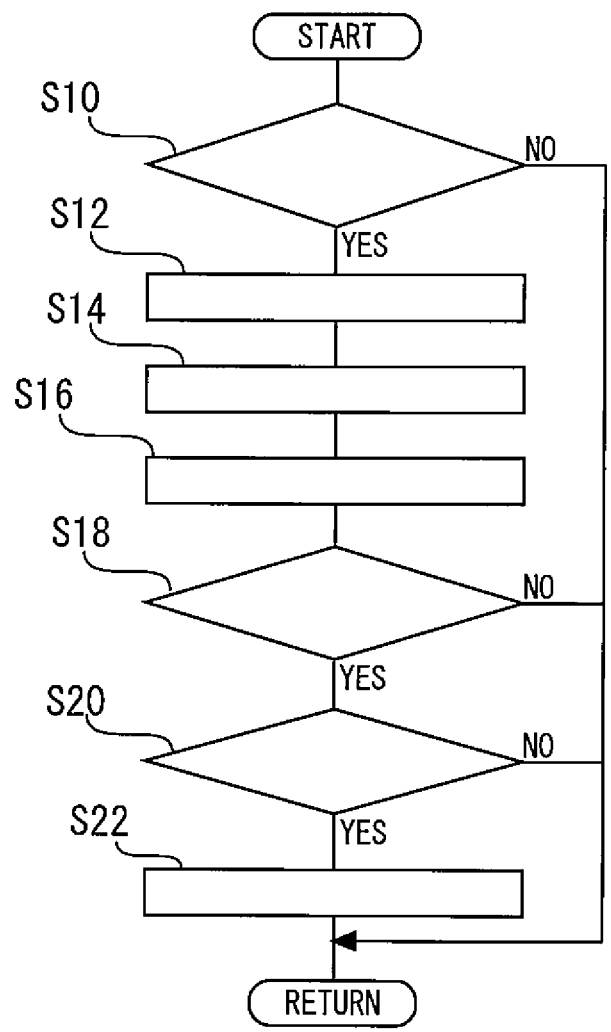
FIG. 2 is a flowchart for explaining a routine of control that is executed by a control device in embodiment 1 of the present invention.

FIG. 2 is a flowchart explaining a routine of control executed by the control device in embodiment 1 of the present invention. The routine in FIG. 2 is a routine that is repeatedly executed at each set time interval during an operation of the internal combustion engine 2. In the routine in FIG. 2, it is firstly determined whether or not an ISC valve full opening prohibition flag is cleared (S10). The ISC valve full opening prohibition flag is a flag which is switched to be set and cleared by processing that will be described later, and while the flag is set, the ISC valve full opening control is prohibited. Accordingly, when it is not recognized that the ISC valve full opening prohibition flag is cleared in step S10, the current process is temporarily ended.

When it is recognized that the ISC valve full opening prohibition flag is cleared in step S10, the request torque is acquired next (S12). Next, all engine control target value is acquired (S14). The engine control target value is, for example, a target opening degree of the throttle valve 28, target ignition timing, a target opening degree of the ISC valve 34 and the like which are set at present. Next, the predicted generation torque is calculated in accordance with these control target values (S16).

Next, it is determined whether or not the predicted generation torque which is calculated in step S16 is larger than the request torque which is acquired in step S12 (S18). When it is not recognized that the predicted generation torque is larger than the request torque in step S18, the current process is temporarily ended.

When it is recognized that the predicted generation torque is larger than the request torque in step S18, it is determined whether or not the second pressure P2 is larger than the first pressure P1 next (S20). When it is not recognized that the second pressure P2 is larger than the first pressure P1 in step S20, the current process is ended.

When it is recognized that the second pressure P2 is larger than the first pressure P1 in step S20, the ISC valve 34 is fully opened (S22). The ISC valve 34 is fully opened in the state in which the second pressure P2 is larger than the first pressure P1, whereby part of intake air flows through the ISC passage 32 and flows back to the upstream side of the intake passage 12 from the downstream side from the surge tank 30 of the intake passage 12. Thereby, the surge tank internal pressure is reduced, and torque is restrained. Thereafter, the current process is ended.

[Outline of Control of Prohibiting Lean Combustion Operation of Present Embodiment]

Incidentally, the internal combustion engine 2 of the present embodiment is an internal combustion engine capable of a lean combustion operation. In the case of the internal combustion engine capable of a lean combustion operation like this, the intake port shapes are optimized to perform lean combustion stably, and are designed to enhance swirl flows and tumble flows that occur in the cylinders. However, during execution of the ISC valve full opening control, the intake air flows back to the upstream side via the ISC passage 32. Therefore, during the ISC valve full opening control, the flow of the intake air in the intake passage 12 also changes significantly. As a result, the swirl flows and the tumble flows which occur in the cylinders become insufficient, and it is conceivable that the lean combustion limit is lowered, or lean combustion becomes unstable in particular.

Figure 3:
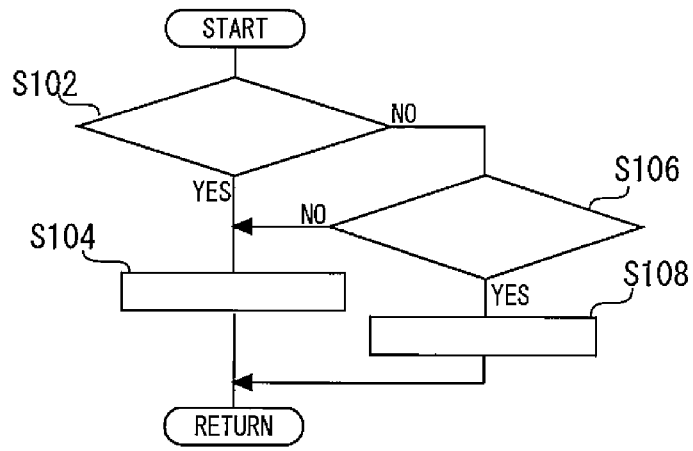
FIG. 3 is a flowchart for explaining a routine of control that is executed by the control device in embodiment 1 of the present invention.

Accordingly, in the present embodiment, the control device executes control of prohibiting a lean combustion operation during the ISC valve full opening control. FIG. 3 is a flowchart for explaining a routine of control executed by the control device in embodiment 1 of the present invention. The routine in FIG. 3 is a routine that is repeatedly executed at each set time interval during an operation of the internal combustion engine 2. In the routine in FIG. 3, it is firstly determined whether or not the ISC valve full opening control is under execution (S102). When it is recognized that the ISC valve full opening control is under execution in step S102, a target air-fuel ratio is set at stoichiometry (S104). Thereby, a lean combustion operation is prohibited. Thereafter, the current process is ended.

When it is not recognized that the ISC valve full opening control is under execution in step S102, it is determined whether or not the condition of the lean combustion operation is established at present in S106. The lean combustion operation condition is stored in the control device in advance. More specifically, the condition that the engine speed of the internal combustion engine 2 is equal to or smaller than the predetermined speed, for example, or the like is cited.

When establishment of the lean combustion operation condition is not recognized in step S106, the flow proceeds to step S104, and the target air-fuel ratio is set at stoichiometry. Thereafter, the current process is ended.

When establishment of the lean combustion operation condition is recognized in step S106, the target air-fuel ratio is set at a predetermined lean air-fuel ratio next (S108). Thereafter, the current process is ended.

By the above process, a lean combustion operation is prohibited during execution of the ISC valve full opening control, and a stoichiometric combustion operation is executed. Thereby, stabilization of combustion during the ISC valve full opening control can be achieved.

[Outline of Prohibition Control of ISC Valve Full Opening Control of Present Embodiment]

Further, the control device of the present embodiment prohibits the ISC valve full opening control at the time of a lean combustion operation. That is to say, when the lean combustion operation is performed, the ISC valve full opening control is not performed even in an operation state in which the ISC valve full opening conditions are established.

Figure 4:
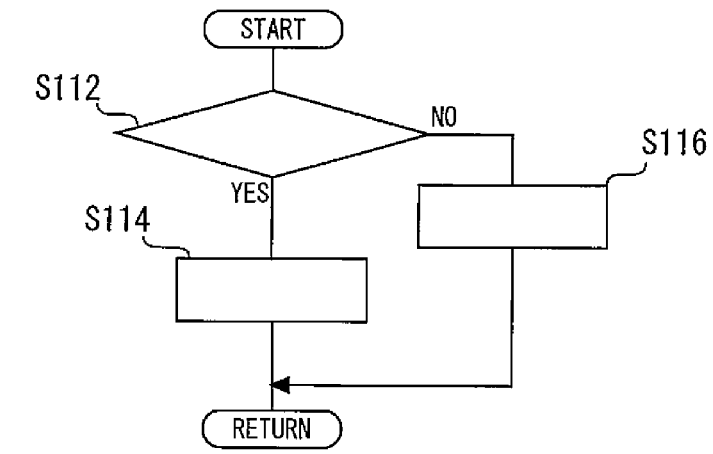
FIG. 4 is a flowchart for explaining a routine of control that is executed by the control device in embodiment 1 of the present invention.

FIG. 4 is a flowchart for explaining a routine of control executed by the control device in embodiment 1 of the present invention. The routine in FIG. 4 is a routine that is repeatedly executed at each set time interval during an operation of the internal combustion engine 2. In the routine in FIG. 4, it is firstly determined whether or not the internal combustion engine 2 is under a lean combustion operation (S112).

When it is recognized that the internal combustion engine 2 is under a lean combustion operation in step S112, the ISC valve full opening prohibition flag is set next (S114). The ISC valve full opening prohibition flag is a flag that is used in determination of whether or not the ISC valve full opening control can be executed in step S10 in the routine in FIG. 2 described above, and by the flag being set, the ISC valve full opening control by the routine in FIG. 2 is prohibited. Thereafter, the current process is ended. In this case, the ISC valve 34 is controlled in accordance with a control program at a normal time of the ISC valve 34 which is stored in the ECU 50 separately. The ISC valve full opening control is prohibited at the time of a lean combustion operation by the process. However, even during a lean combustion operation, the ISC valve 34 is opened by the control flag at the normal time, and is fully opened in some cases.

When it is not recognized that the internal combustion engine is under a lean combustion operation at present in step S112, the ISC valve full opening prohibition flag is cleared (S116). Thereby, execution of the routine in FIG. 2 is permitted, and when the ISC valve full opening conditions which are determined in the routine in FIG. 2 are established, the ISC valve 34 is fully opened. Thereafter, the current process is ended.

As described above, according to the present embodiment, during execution of the ISC valve full opening control, switching to the lean combustion operation is prohibited, whereas during the lean combustion operation, the ISC valve full opening control is prohibited. Thereby, while stable combustion is ensured in the lean combustion operation region, torque variation can be restrained outside the lean combustion operation region.

In the present embodiment, the case is described, in which the opening degree of the ISC valve 34 is made full opening which is a maximum opening degree when the ISC valve full opening conditions are established. However, the present invention is not limited thereto, and the opening degree of the ISC valve 34 may be made larger than a predetermined reference opening degree. Here, the reference opening degree can be properly set at such a large opening degree that can reduce generation torque by causing the intake air to flow back early by opening the ISC valve. This similarly applies to other embodiments.

Further, the case is described, in which the system of the present embodiment includes the first pressure sensor 42 and the second pressure sensor 44, and acquires the first pressure P1 and the second pressure P2 based on the outputs from these sensors. However, the present invention may have a configuration that does not have both or one of the first pressure sensor 42 and the second pressure sensor 44. In the case like this, estimated values of the pressures of the respective portions can be used as the first pressure P1 and the second pressure P2. This similarly applies to other embodiments.

Further, in the present embodiment, the case is described, in which the control device executes both the routines in FIG. 3 and FIG. 4, and thereby prohibits switching to the lean combustion operation during the ISC valve full opening control, and prohibits execution of the ISC valve full opening control during the lean combustion operation. However, the present invention is not limited to the one that executes both the controls, but may be the one that performs only one control. This similarly applies to other embodiments.

Embodiment 2

Figure 5:
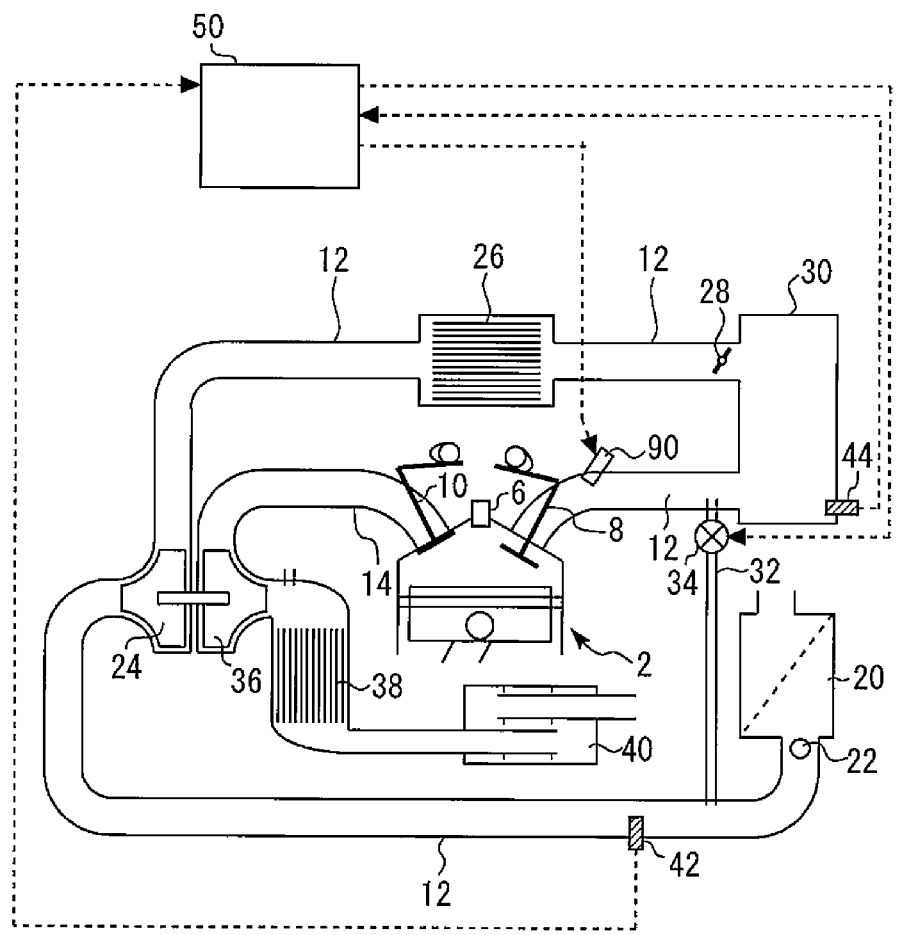
FIG. 5 is a schematic diagram for explaining an entire configuration of a system of embodiment 2 of the present invention.

A system in FIG. 5 has a configuration that is the same as the system in FIG. 1 except for a point that the system in FIG. 5 has port injectors 90 in place of the cylinder injectors. The system in the present embodiment executes ISC valve full opening control when generation torque becomes larger than request torque similarly to the system in embodiment 1. Further, during execution of the ISC valve full opening control, control of setting a timing for fuel injection from the port injector 90 at a valve opening timing of the intake valve is performed.

Figure 6:
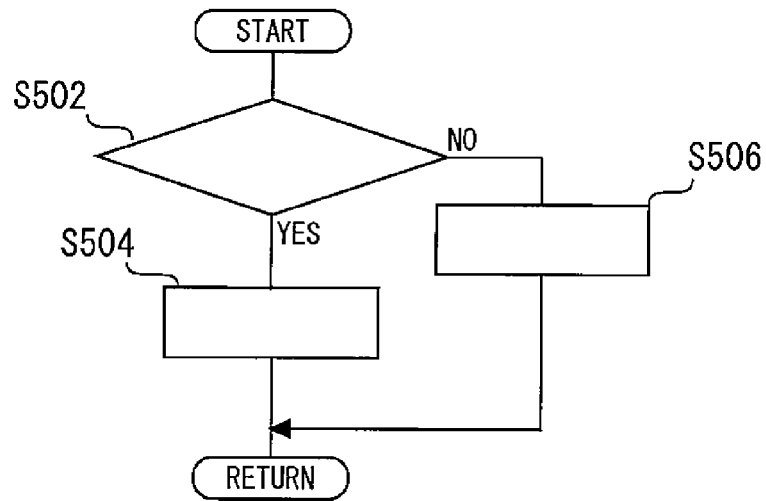
FIG. 6 is a flowchart for explaining a routine of control that is executed by a control device in embodiment 2 of the present invention.

FIG. 6 is a flowchart for explaining a routine of control that the control device executes in embodiment 5 of the present invention. The routine in FIG. 6 is a routine that is repeatedly executed at each predetermined time together with the routines in FIG. 2 to FIG. 4. In the routine in FIG. 6, it is firstly determined whether or not the ISC valve full opening control is under execution at present (S502). When it is recognized that the ISC valve full opening control is under execution at present, a port injection timing is set at a time of opening of the intake valve next (S504). Thereafter, the processing of this time is ended.

When it is not recognized that ISC valve full opening control is under execution in step S502, normal control which determines the port injection timing in accordance with a control program at a time of a normal operation is performed in step S506 (S506). Thereafter, the processing of this time is ended.

As described above, according to the present embodiment, the port injection timing in the ISC valve full opening control is set at the time of opening of the intake valve. Thereby, even when fuel is injected to the intake port during the ISC valve full opening control, fuel can be restrained from flowing back to the air cleaner 20 side via the ISC passage 32.

Note that in the present embodiment, the system having the port injectors 90 in place of the cylinder injectors is described. However, the present invention is not limited to this, and may also be a system having both the cylinder injectors 4 and the port injectors 90. In this case, the timing for fuel injection from the port injector 90 in execution of the ISC valve full opening control is set at the intake valve opening timing, and thereby release of fuel into the atmosphere by backflow of the fuel can be restrained.

Further, in the case of a system that has both the cylinder injector 4 and the port injector 90, and controls an injection sharing ratio of fuel injection from both the cylinder injector and the port injector, fuel injection from the port injector 90 may be stopped during execution of the ISC valve full opening control.

Figure 7:
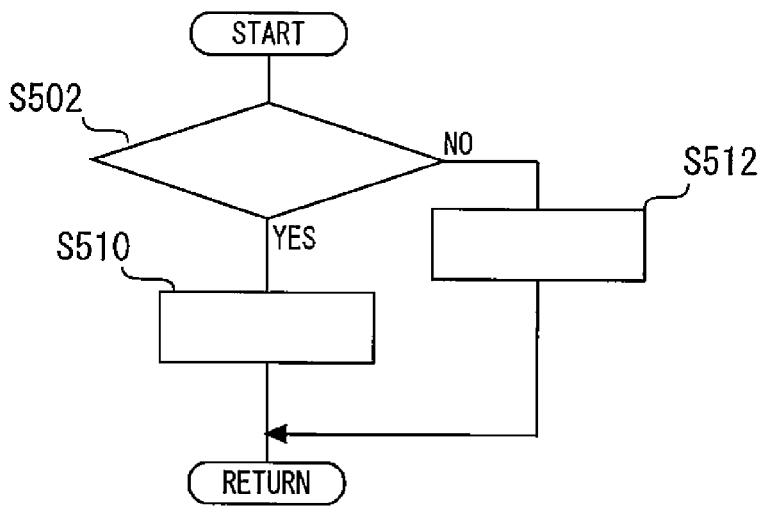
FIG. 7 is a flowchart for explaining a routine of another control that is executed by the control device in embodiment 2 of the present invention.

FIG. 7 is a specific routine of control like this. The routine in FIG. 7 is executed in place of the routine in FIG. 6. As shown in FIG. 7, when it is recognized that the ISC valve full opening control is under execution in step S502, fuel injection from the port injector 90 is prohibited in step S510. Meanwhile, when it is not recognized that the ISC valve full opening control is under execution in step S502, the fuel injection sharing ratio by the cylinder injector 4 and the port injector 90 is determined by normal control according to the control program at the time of a normal operation.

Further, in embodiment 2, the case in which the control concerning the lean combustion operation in embodiment 1, and the control of port injection are combined is described.

That is to say, the routine in FIG. 6 or FIG. 7 is executed when the ISC valve full opening control is under execution by the processing in S22 in FIG. 2. According to the routine in FIG. 2, the ISC valve full opening control in the lean combustion operation is prohibited. Further, the routine in FIG. 3 is combined and executed, and thereby the lean combustion operation in the ISC valve full opening control is prohibited. This similarly applies to other embodiments.

However, the present invention is not limited to the above, and both or one of the prohibition control of the ISC valve full opening control at the time of the lean combustion operation in embodiment 1 and prohibition control of the lean combustion operation in the ISC valve full opening control may be configured not to be performed by being combined. In the case as above, for example, determination of whether or not the ISC valve full opening prohibition flag is cleared in step S10 in FIG. 2 and/or the routine in FIG. 3 may be configured not to be performed. This similarly applies to other embodiments.

Note that in the present embodiment, the processing in step S504 is executed, whereby "restriction means" or "means for setting" the fuel injection timing "at the opening timing of the intake valve" of the present invention is realized. Further, the processing in step S510 is executed, whereby "the restriction means" or "the means for prohibiting fuel injection from the port injector" of the present invention is realized.

When the numerals of the numbers, the quantities, the amounts, the ranges and the like of the respective elements are mentioned in the above embodiment, the present invention is not limited by the mentioned numerals, unless explicitly mentioned otherwise, or unless clearly specified by the numerals theoretically. Further, the structures, the methods and the like explained in the embodiment are not always essential to the invention, unless explicitly mentioned otherwise, or unless clearly specified by the structures, the methods and the like theoretically.

DESCRIPTION OF REFERENCE CHARACTERS

2: Internal combustion engine
4: cylinder injector
6: ignition plug
8: intake valve
10: exhaust valve
12: intake passage
14: exhaust passage
20: air cleaner
22: air flow meter
24: compressor
26: intercooler
28: throttle valve
30: surge tank
32: ISC passage
34: ISC valve
36: exhaust turbine
38: catalyst
40: muffler
42: first pressure sensor
44: second pressure sensor
50: ECU
90: port injector

The invention claimed is:

1. A control device for an internal combustion engine, comprising: a throttle valve that is installed in an intake passage of the internal combustion engine including a supercharger; an Idle Speed Control (ISC) passage that connects an upstream side and a downstream side of the throttle valve, in the intake passage; an ISC valve that regulates an amount of air that flows in the ISC passage by being controlled to a predetermined opening degree; a first pressure sensor upstream of the throttle valve for determining a first pressure and second sensor downstream of the throttle valve for determining a second pressure; a port injector that is installed to inject fuel to an intake port of each of cylinders of the internal combustion engine; control means for executing valve opening control that makes an opening degree of the ISC valve an opening degree larger than a reference opening degree, when request torque required by the internal combustion engine is smaller than estimated torque that can be generated in the internal combustion engine and the second pressure is greater than the first pressure; and restriction means for restricting a timing for fuel injection from the port injector, during execution of the valve opening control.

2. The control device for an internal combustion engine according to claim 1,
wherein the restriction means includes means for setting a timing for fuel injection from the port injector at an opening timing of an intake valve of the cylinder in which the port injector is installed, during execution of the valve opening control.

3. The control device for an internal combustion engine according to claim 1,
wherein the restriction means includes means for prohibiting fuel injection from the port injector during the valve opening control.

4. A control device for an internal combustion engine, comprising: a throttle valve that is installed in an intake passage of the internal combustion engine including a supercharger; an Idle Speed Control (ISC) passage that connects an upstream side and a downstream side of the throttle valve, in the intake passage; an ISC valve that regulates an amount of air that flows in the ISC passage by being controlled to a predetermined opening degree; a first pressure sensor upstream of the throttle valve for determining a first pressure and second sensor downstream of the throttle valve for determining a second pressure; and a port injector that is installed to inject fuel to an intake port of each of cylinders of the internal combustion engine, wherein the control device is configured to: execute valve opening control that makes an opening degree of the ISC valve an opening degree larger than a reference opening degree, when request torque required by the internal combustion engine is smaller than estimated torque that can be generated in the internal combustion engine and the second pressure is greater than the first pressure; and restrict a timing for fuel injection from the port injector, during execution of the valve opening control.

* * * * *